No. 617,390. Patented Jan. 10, 1899.
G. F. BEEBE.
PROPELLING MECHANISM FOR BICYCLES.
(Application filed Dec. 31, 1897.)
(No Model.) 2 Sheets—Sheet 1.
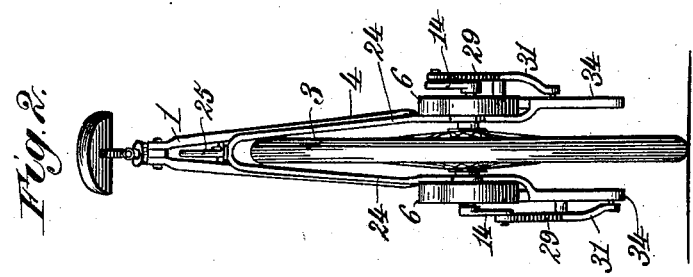
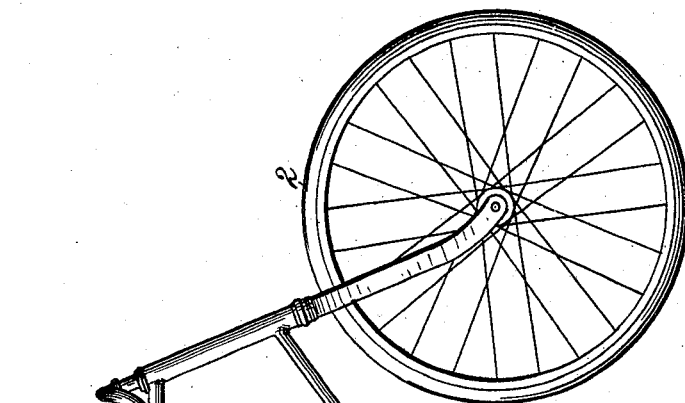
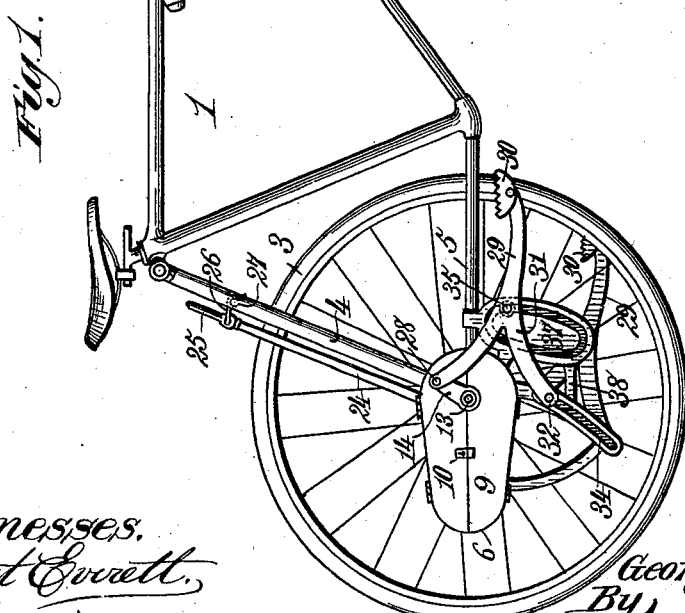
Witnesses. Inventor,
George F. Beebe,
By James L. Norris
Atty.

No. 617,390. Patented Jan. 10, 1899.
G. F. BEEBE.
PROPELLING MECHANISM FOR BICYCLES.
(Application filed Dec. 31, 1897.)
(No Model.) 2 Sheets—Sheet 2.
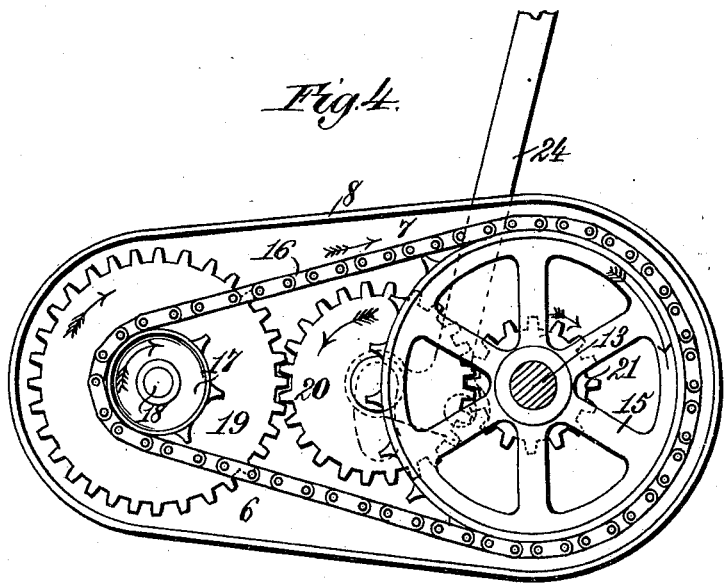
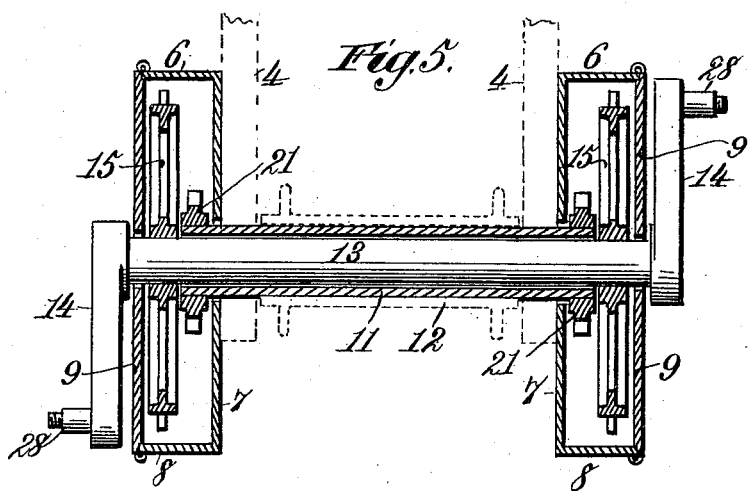
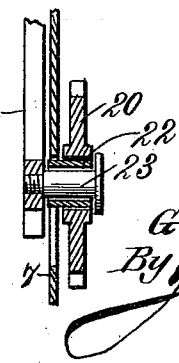
Witnesses
Robert Everett
Inventor
George F. Beebe
By James L. Norris
Att'y

UNITED STATES PATENT OFFICE.

GEORGE F. BEEBE, OF MUSKOGEE, INDIAN TERRITORY, ASSIGNOR OF ONE-THIRD TO ORRIN K. PALMER AND BENJAMIN L. TAFT, OF PARSONS, KANSAS.

PROPELLING MECHANISM FOR BICYCLES.

SPECIFICATION forming part of Letters Patent No. 617,390, dated January 10, 1899.

Application filed December 31, 1897. Serial No. 665,107. (No model.)

*To all whom it may concern:*

Be it known that I, GEORGE F. BEEBE, a citizen of the United States, residing at Muskogee, in the Indian Territory, have invented new and useful Improvements in Propelling Mechanism for Bicycles, of which the following is a specification.

This invention relates to propelling mechanism for bicycles, and has for its object to provide improved driving mechanism combining great simplicity, durability, and compactness in construction and by means of which the bicycle may be propelled at a high rate of speed at a minimum expenditure of strength and exertion on the part of the rider.

To these ends my invention consists in the features and in the construction, arrangement, and combination of parts hereinafter described, and particularly pointed out in the claims following the description, reference being had to the accompanying drawings, forming a part of this specification, wherein—

Figure 1 is a side elevation of a bicycle with my improved driving mechanism applied thereto. Fig. 2 is a rear elevation thereof. Fig. 3 is a detail view of one of the pedal-levers, showing the lever-guides in section. Fig. 4 is a view in elevation of the gearing. Fig. 5 is a transverse sectional view taken through the center of the driving or rear wheel of the bicycle, the crank-shaft being shown in elevation; and Fig. 6 is a detail sectional view illustrating the manner of journaling the shifting gear-wheel.

Referring to the drawings, the numeral 1 indicates the frame of the bicycle, constructed in the usual and ordinary manner, and 2 and 3 the front and rear wheels, respectively, the front wheel, as shown, being preferably smaller than the rear wheel. To the rear ends of the forked braces 4 and 5 of the frame, on opposite sides of the driving-wheel, are attached the gear-casings 6, each consisting of an elongated disk 7, provided with a marginal flange 8 and a two-part cover 9. The disk 7 lies next to the driving-wheel, and the sections 9 are hinged to the flange 8 and are adapted when closed to overlap one another at their meeting edges and be held closed by a catch 10 of any suitable or preferred construction. The edge of the flange 8 is rabbeted, as most clearly shown in Fig. 5, and the edges of the sections of the cover are correspondingly rabbeted, whereby when the cover is closed the casing will be dust and weather proof. Journaled in the rear fork 4 of the frame is a sleeve 11, on which is fixed the hub 12 of the driving-wheel 3. The sleeve 11 passes into the casing 6 through suitable apertures formed in the disks 7, and through said sleeve loosely passes a crank-shaft 13, which projects at its opposite ends through the covers 9 of the casings and has fixed thereon cranks 14. Inasmuch as the gearing in the casings is the duplicate one of the other one only need be described in detail. On the crank-shaft 13, within the casing, is fixed a comparatively large sprocket-wheel 15, which is connected with a relatively small sprocket-wheel 17 by a drive-chain 16. The sprocket-wheel 17 is journaled on a stud-shaft 18, fixed in the casing and is rigidly attached to and revolves with a gear-wheel 19, which is much larger, as shown most clearly in Fig. 4, than the sprocket-wheel 17. The gear-wheel 19 meshes with an intermediate gear-wheel 20, which in turn meshes with a gear-wheel 21, fixed on the end of the sleeve 11. As shown, the intermediate gear-wheel 20 is smaller than the gear-wheel 19 and the gear-wheel 21 is smaller than the gear-wheel 20, whereby at each revolution of the sprocket-wheel 15 the gear-wheel 21, and hence the drive-wheel 3, will be rotated many times, the number of such rotations being of course dependent upon the relative sizes of the sprocket and gear wheels. The intermediate gear-wheel 20 is journaled loosely on a sleeve 22, which in turn is loosely journaled on a stud-shaft 23, fixed in the end of the short arm of a bell-crank lever 24, which is pivoted at its elbow to the outside or the side next the drive-wheel of the disk 7. The disk 7 is provided with an arc-shaped slot 25, through which the shaft 23 and sleeve 22 project and are adapted to move therein. The upper ends of the respective bell-crank levers 24 terminate in a single handle 25, which extends up beneath the saddle in convenient reach of the rider. It will be manifest that by turning the handle up into the position shown in Fig. 1 the intermediate gear-wheels 20 will be caused to mesh with both the gear-wheels 19 and 21, and the gearing will then be in position to propel the bicycle, and when the handle is thrown rearward and downward the bell-crank levers will throw the intermediate gear-wheels 20 out of gear with the gear-wheels 19 and 21, thus throwing the driving mechanism out of operation. The bell-crank levers 24 are held in the proper position to maintain the intermediate gear-wheels in operative position by a hook or catch 26, which is arranged to engage the usual cross-brace 27 of the rear fork 4. It is evident that any suitable or preferred form of catch or fastening may be substituted for the hook or catch 26 shown and described.

From the foregoing description this part of the invention will be readily understood. The intermediate wheels 20 being in operative position, as shown in Fig. 4, and the cranks 14 being rotated, the sprocket-wheel 15, through the medium of the chain 16, rotates the sprocket-wheel 17 and the gear-wheel 19, which is fast to the sprocket-wheel 17. The gear-wheel 19 rotates the intermediate gear-wheel 20, which latter rotates the gear-wheel 21, which is fast on the sleeve 11, and as said sleeve is rigid with the hub 12 of the drive-wheel the latter is rotated with the gear-wheel 21. The direction of rotation of the wheels is indicated by the arrows, and the drive-wheel is rotated several times at each rotation of the sprocket-wheel 21, as before described, thus enabling the bicycle to be driven at a high rate of speed without a correspondingly rapid movement of the feet of the rider.

In order that the power of the rider may be utilized the most effectively to drive the gearing and in such manner as to produce the least strain upon and fatigue to the muscles of the legs, feet, and ankles, I provide the following mechanism for operating the cranks: To a stud-shaft 28, fixed in the end of each of the cranks 14, is pivoted the rear end of a pedal-lever 29, which at its forward end is provided with a pedal 30. The rear portion of the pedal-lever is forked or bifurcated, as most clearly shown in Fig. 1, forming a downwardly and rearwardly extending arm 31, which at its extremity is provided with a stud-shaft 32, on which is journaled a loose sleeve 33. The sleeve 33 engages and is free to move in a slotted guide 34, which is slightly curved, as shown, and is fixed at its upper end to the disk 7 of the gear-casing. At a point intermediate its ends the pedal-lever 29 has fixed thereto a stud-shaft 35, carrying a loose sleeve 36, which engages and is free to travel in an approximately elliptical guide 37, which is fixed to the disk 7 of the gear-casing and to the forked brace 5 of the frame, as shown. The guides 34 and 37 are rigidly connected one to the other by a brace or stay 38. The operation of this portion of the invention is as follows: The cranks 14, to which the pedal-levers are attached, extend in opposite directions, as usual, so that as one pedal-lever is depressed the other pedal-lever is raised. As the rider depresses one of the pedal-levers the pivot 32 acts as a fulcrum upon which the pedal-lever oscillates, and in the oscillation of the lever this fulcrum-point is constantly shifted to permit the pedal-lever to rotate the crank to which it is attached. During this movement the other pedal-lever is raised, so that the moment one pedal-lever has reached its lowermost limit of movement and has ceased to exert any power to further rotate its crank the other pedal-lever has reached its highest limit of movement and commences to rotate the other crank. The rotation thus communicated to the crank-shaft is continuous and uniform. The guides 37 insure the pedal-levers oscillating in a perfectly rectilinear direction and prevent any lateral or side-to-side vibration of said levers. The motion of the rider's feet in operating the pedal-levers is a most natural one, much resembling the movement of a pedestrian's feet, and hence placing as little strain and labor on the muscles of the legs, feet, and ankles of the rider as possible and reducing the resulting fatigue to a minimum. Moreover, by means of the mechanism shown and described the rider is enabled to apply the power in the most direct and effective manner, thus effecting an economy in the expenditure of the propulsive force to drive the bicycle.

By means of the gearing shown the rider is enabled to attain high speed in the manner described, and by the combination of sprockets and gears is secured the beneficial features of each, the sprockets and chains affording the elasticity which has been found very desirable and particularly advantageous in starting the wheel, and the direct and positive action of the toothed gears. This combination-gearing is also extremely compact, occupying but little space, and by means of the shifting intermediate gear-wheel both sets of gearing may be instantly and simultaneously thrown into and out of operation. By means of the gear-casings the gearing is effectually protected from the destruction and objectionable effects of dust and weather, while at the same time access may be instantly had to the gearing without removing any parts by merely throwing back the hinged sections of the covers to the gear-casings.

I do not confine myself to any particular shape or size of the disk and cover or to any particular location of the same. It will also be understood that various changes or modifications may be made in the details of construction of other parts of the machine and their arrangement without departing from the spirit of my invention.

Having described my invention, what I claim is—

1. In a bicycle-driving mechanism, the combination with the crank-shaft, of a sprocket-wheel fixed thereon, a smaller sprocket-wheel connected therewith by a chain, a gear-wheel rigid with the smaller sprocket-wheel, a small gear-wheel rigid with the drive-wheel of the bicycle, a pivoted bell-crank lever having one arm extended to within reach of the rider, and an intermediate gear-wheel journaled on the other arm of said bell-crank lever and adapted to be thrown into and out of gear with the large and small gear-wheels by said lever, substantially as described.

2. In a bicycle-driving mechanism, the combination with the frame, of the sleeve 11 journaled in the frame and having rigidly mounted thereon the drive-wheel, the gear-casing 6 arranged over the end of the sleeve and fixed to the frame, the crank-shaft 13 journaled in said sleeve and having fixed thereon the sprocket-wheel 15, the smaller sprocket-wheel 17, the chain 16 connecting said sprocket-wheels, the gear-wheel 19 rigid with the sprocket-wheel 17, the small gear-wheel 21 fixed on the said sleeve, the bell-crank lever 24 pivoted to the gear-casing and provided at one end with a stud-shaft and sleeve projecting through a slot in the casing, and an intermediate gear-wheel 20 journaled on said sleeve and arranged to be thrown into and out of gear with the said gear-wheels by said bell-crank lever, substantially as described.

3. In a bicycle-driving mechanism, the combination with the crank-shaft, of a sprocket-wheel fixed thereon, a smaller sprocket-wheel connected therewith by a chain, a gear-wheel rigid with the smaller sprocket-wheel, a small gear-wheel rigid with the drive-wheel of the bicycle, a pivoted bell-crank lever having one arm extended to within reach of the rider, an intermediate gear-wheel journaled in the other arm of said bell-crank lever and adapted to be thrown into and out of gear with the large and small gear-wheel by said lever, and a catch for fastening the said lever to the rear fork of the frame to hold said intermediate gear in gear with the other gear-wheels, substantially as described.

4. In a bicycle, the combination with the driving crank-shaft and crank, of a forked pedal-lever, the rear end of one of said forks being pivotally connected to the crank and the other fork provided with a stud, and a fixed slotted guide in which said stud is movably fitted to form a shifting fulcrum for the pedal-lever, substantially as described.

5. In a bicycle, the combination with the driving crank-shaft and cranks, of pedal-levers each forked at its rear end, the upper forked end of each lever being pivotally connected to the corresponding crank and the lower forked end provided with a stud, and fixed slotted guides in which said studs are movably fitted to form shifting fulcrums for the pedal-levers, said slotted guides being rearwardly curved, substantially as described.

6. In a bicycle, the combination with the driving crank-shaft and crank, of a pedal-lever pivotally connected at its rear end to said crank and provided with two studs, a fixed slotted guide in which the rearmost stud is movably fitted to form a shifting fulcrum for the pedal-lever, and a fixed endless, slotted guide in which the foremost stud travels, substantially as described.

7. In a bicycle, the combination with the driving crank-shaft and crank, of a pedal-lever pivotally connected at its rear end to said crank and provided with two studs, a fixed slotted guide in which the rearmost stud reciprocates to form a shifting fulcrum for the pedal-lever, and an approximately elliptical, fixed slotted guide in which the foremost stud oscillates to prevent lateral vibration of the pedal-lever and cause the pedal to move in a substantially rectilinear direction, substantially as described.

8. In a bicycle, the combination with the driving crank-shaft and crank, of a pedal-lever forked at its rear end to form two diverging arms, the upper of said arms being pivotally connected to the crank and the lower arm provided with a stud, a fixed slotted guide in which the stud on the lower arm is movably fitted to form a shifting fulcrum for the pedal-lever, a stud fixed on the pedal-lever forward of its forked end, and a fixed, approximately elliptical slotted guide in which said last-mentioned stud travels, substantially as described and for the purpose specified.

In testimony whereof I have hereunto set my hand in presence of two subscribing witnesses.

GEORGE F. BEEBE.

Witnesses:
JOHN WATKINS,
N. O. STEPHENSON.